United States Patent [19]

Marantz et al.

[11] Patent Number: 5,468,295
[45] Date of Patent: Nov. 21, 1995

[54] APPARATUS AND METHOD FOR THERMAL SPRAY COATING INTERIOR SURFACES

[75] Inventors: Daniel R. Marantz, Sands Point; Keith A. Kowalsky, East Norwich, both of N.Y.

[73] Assignee: Flame-Spray Industries, Inc., Stony Brook, N.Y.

[21] Appl. No.: 169,332

[22] Filed: Dec. 17, 1993

[51] Int. Cl.⁶ .............................. B05B 5/00; C23C 4/00; C23C 16/00; B23K 9/04
[52] U.S. Cl. .................... 118/723 DC; 118/300; 118/315; 118/317; 118/715; 219/76.14; 219/76.16; 219/121.47; 219/121.5; 219/121.51; 219/121.53; 219/121.55; 204/298.41
[58] Field of Search .................... 118/300, 302, 118/317, DIG. 10, 710, 723 DC, 306, 313, 315, 715; 204/298.41; 219/121.47, 121.5, 121.51, 121.53, 121.55, 121.56, 76.14, 76.16; 239/399, 403, 436, 562, 695, 706

[56] References Cited

U.S. PATENT DOCUMENTS

| | | | |
|---|---|---|---|
| 1,968,992 | 8/1934 | Conkling | 118/302 |
| 2,303,088 | 11/1942 | Perkins | 91/44 |
| 2,428,292 | 9/1947 | Queen | 91/45 |
| 2,478,711 | 8/1949 | Robinson et al. | 91/55 |
| 2,484,018 | 10/1949 | Crom | 25/38 |
| 2,610,092 | 9/1952 | Thompson | 118/317 |
| 3,013,528 | 12/1961 | Bland | 118/302 |
| 3,085,750 | 4/1963 | Kenshol | 239/84 |
| 3,546,415 | 12/1970 | Marantz | 219/76 |
| 4,333,416 | 6/1982 | Rotolico et al. | 118/47 |
| 4,464,414 | 8/1984 | Milewski et al. | 427/455 |
| 4,490,411 | 12/1984 | Feder | 427/46 |
| 4,668,852 | 5/1987 | Fox et al. | 219/76.14 |
| 5,080,056 | 1/1992 | Kramer et al. | 123/193.4 |
| 5,109,150 | 4/1992 | Rogers | 219/121.47 |
| 5,191,186 | 3/1993 | Crapo, III et al. | 219/121.55 |
| 5,194,304 | 3/1993 | McCune, Jr. et al. | 427/456 |
| 5,271,967 | 12/1993 | Kramer et al. | 427/455 |
| 5,334,235 | 8/1994 | Dorfman et al. | 75/255 |

FOREIGN PATENT DOCUMENTS

| | | |
|---|---|---|
| 729469 | 12/1942 | Germany. |
| WO9008203 | 7/1990 | WIPO. |

OTHER PUBLICATIONS

D. R. Marantz; Improvements in Electric Arc Metallising Systems in the United States of America; pp. 53–61.
E. Kretzschmar; Variants of Metal Spraying and Problems of Atomisation in Electric Arc Spraying; pp. 43–52.

*Primary Examiner*—R. Bruce Breneman
*Assistant Examiner*—Rodney G. McDonald
*Attorney, Agent, or Firm*—Howard & Howard

[57] ABSTRACT

A method of thermal spray coating a surface with a metal coating material includes the provision of a nozzle about a thermal spray coating apparatus, such as a two wire electric-arc apparatus. The nozzle includes a plurality of ports facing generally radially inwardly towards a coating material particle stream, such as an atomized molten metal stream of a two-wire arc thermal spray apparatus. The ports sequentially receive a deflecting gas flow, such that the direction moves circumferentially about the axis of the particle stream. The deflecting gas entrains the coating material and carries it radially to the surface of the part to be coated or the nozzle assembly. By utilizing a plurality of valve ports, one simplifies the assembly over prior art systems which have rotated the part to be coated. In one embodiment of this invention, a valve disk selectively communicates a compressed gas to the ports sequentially. In a second embodiment, each of the ports are associated with individual electrically operated valves which are sequentially opened to achieve the changing direction of the deflecting gas flow. A method and apparatus for simultaneously coating a plurality of bores main body, such as an engine block, is also disclosed. The apparatus includes a plurality of deflecting nozzles which are simultaneously inserted in each of the bore. The preferred method includes initiating an axial particulate coating stream, prior to inserting the deflecting nozzles in the bores, then inserting the nozzles in the bores and deflecting stream radially, to coat all of the bores simultaneously.

23 Claims, 3 Drawing Sheets

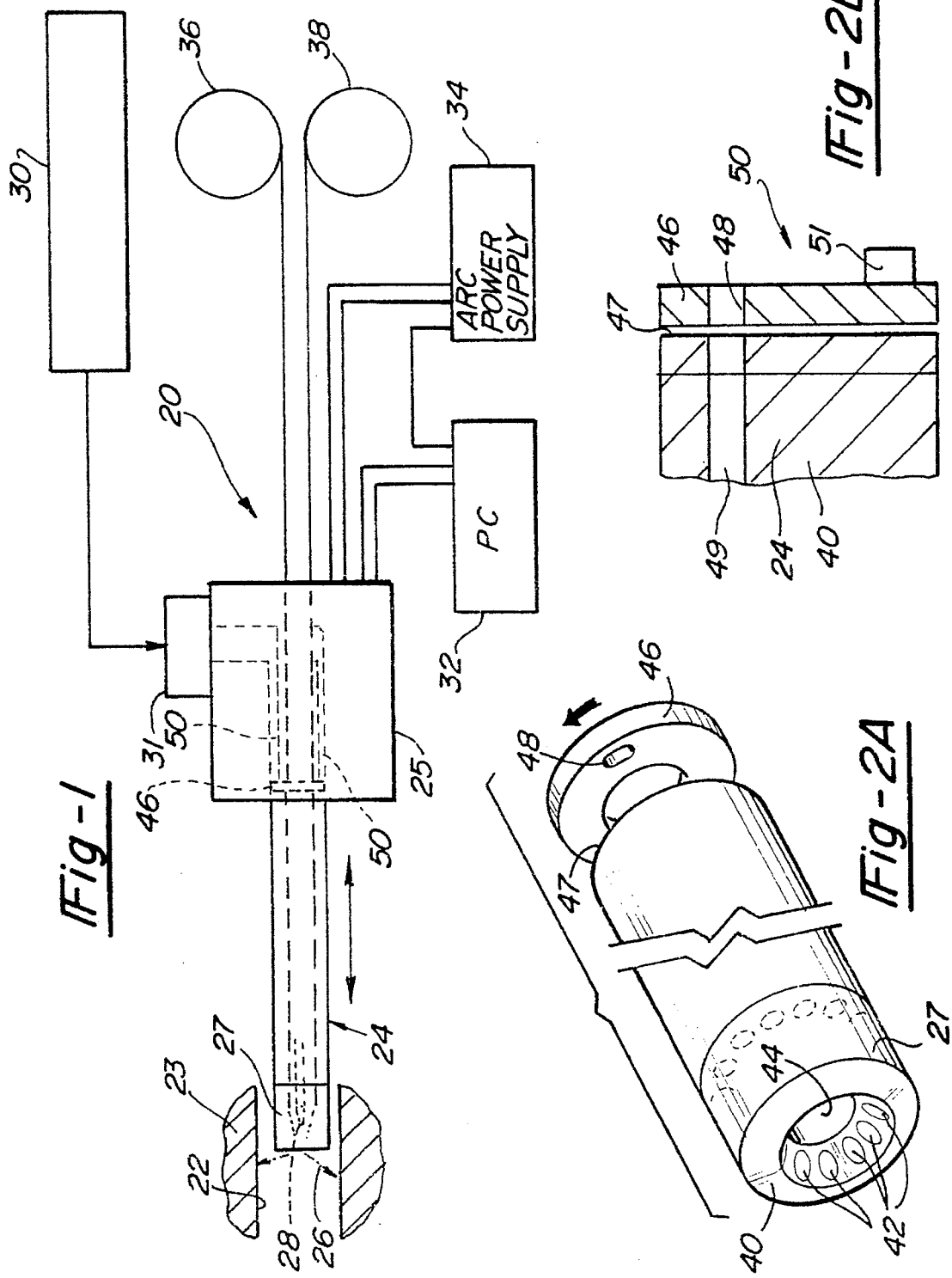

APPARATUS AND METHOD FOR THERMAL SPRAY COATING INTERIOR SURFACES

This application in general relates to an apparatus and method which is particularly beneficial for thermal spray coating the interior surface of bores, or generally concave surfaces, with a metallic coating. In the preferred embodiments of the present invention, neither the part to be coated, nor the coating head is rotated.

Various types of thermal spray coating methods and systems are known in the prior art. These coating methods comprise the deposition of a wire or powdered material onto a surface to be coated by any one of several methods. In one successful method, known as electric-arc (two wire) spraying, two consumable wires form the electrodes of an electric arc. The two wires are electrically energized and converge adjacent a point, at which an electric arc is formed. A stream of compressed atomizing gas is passed through the converging point to atomize the molten metal and drive a molten metal particle stream formed by the electric arc along an axis forwardly of the converging zone or point.

Electric-arc spraying and various other methods for creating a coating material have been utilized in a variety of applications. In one potential application, a coating apparatus is inserted into a cylindrical bore which would be desirably coated by a metallic coating material and the part must be rotated. An example of such a bore coated by this method is a gun mount recoil liner.

In the proposed prior art methods of electric arc "two wire" spraying, problems have arisen in depositing the metallic coating material on the surface of the hollow bores evenly and in a controlled fashion. A coating material particle stream is typically directed out of the coating apparatus along a center line of the apparatus. The particle stream is then deflected to the surface to be coated. In one proposed method, deflecting gas is directed from a nozzle to deflect the particle stream radially outwardly towards the bore to be coated. The coating head and deflector nozzle do not rotate. The part to be coated is rotated in this prior art method. While this method may have benefits, there are several drawbacks. A major drawback is that some parts, such as engine blocks, do not lend themselves to being rotated during the coating process. In this application there are several spaced bores to be coated, requiring repeated rotation of the part around the longitudinal axis of each bore, which make this process commercially impractical.

In other prior art thermal spray systems where the nozzle is rotated, such as flame and plasma spray systems, there are mechanical problems associated with rotating the head. In an electric-arc two wire method, as described above, it would not be practical to rotate the arc apparatus, since to do so would require the rotation of the two wires being consumed.

It has also been proposed in applications other than electric-arc two wire applications to rotate a deflecting air nozzle about a coating stream. A deflecting air flow deflects the coating stream to the surface to be coated. However, a commercially acceptable rotating deflecting stream has not been proposed for electric-arc two wire applications, particularly for parts having multiple bores.

SUMMARY OF THE INVENTION

In a first aspect of this invention, an apparatus for thermal spraying a coating material onto a cylindrical bore, or other concave surface, includes a coating apparatus directing a particle stream along a central axis as the coating apparatus moves axially opposite the surface of the concave surface to be coated. A plurality of ports are spaced circumferentially about the central axis, with each of the ports extending generally radially inwardly from generally radially outer positions relative to the central axis. A supply of compressed deflecting gas is communicated to those ports, sequentially about the circumference of the central axis. The deflecting gas is set to a higher pressure and/or velocity than the atomizing gas. The ports direct this deflecting gas towards the particle stream, for example adjacent the theoretical intersection point of a two-wire arc apparatus. The particle stream is carried with the deflecting gas onto the concave surface to be coated. Since the deflecting gas progresses sequentially along the ports, the deflecting gas, and hence the coating material, covers the entire surface to be coated about the circumference of the central axis.

In one preferred embodiment of this invention, more than one of the ports may be delivering deflecting gas towards the particle stream at any one time. As an example, as a first port is completing its radial deflection of the particle stream, a second port is beginning to receive deflecting gas. In this way, "low spots" in the amount of deflecting air will be reduced or eliminated. Low spots are areas of reduced coating thickness. That is, as a first port is in its latter stage of its deflecting cycle, a second port is beginning its cycle. The total deflecting air flow at any one moment will thus be relatively constant and the total flow towards any area on the part to be coated. In a most preferred embodiment of this invention, as many as three ports may be delivering deflecting gas at any one time, with a first port ending its deflecting cycle, a second central adjacent port being fully connected with the compressed gas, and a third port adjacent to the central port is just beginning its connection to compressed gas, starting its deflecting cycle.

In a further preferred feature of this invention, the deflecting gas may be heated. The heated deflecting gas yields a higher velocity as it expands on exiting the deflecting nozzle. This in turn increases the degree of atomization and the velocity of the coating material directed to the surface to be coated. Further, the heated deflecting gas maintains the relatively high temperature in the particle stream, reducing the energy loss of the particles and resulting in an improved finer and more dense coating.

In a first embodiment of the coating apparatus of this invention, a valve disk is connected to the coating apparatus, preferably at a location removed from the part to be coated. The valve disk has an aperture which is selectively and sequentially aligned with each deflecting air port. In a more preferred embodiment, this aperture may be circumferentially extended enough such that it can communicate with as many as three ports at any one time to provide the benefits discussed above. The disk valve may preferably be driven by a plurality of turbine blades, such that the supply of compressed gas may drive the valve disk, and also be directed to the deflecting air ports.

In a method of coating a part incorporating this first embodiment, a coating apparatus is disposed within a part to be coated. The coating apparatus is moved axially along the concave surface of the part to be coated. As an example, the coating apparatus is coating the internal surface of a cylindrical bore within a part, such as a vehicle engine block. While the coating apparatus is moved axially along the surface to be coated, compressed air is directed towards the valve disk turbine blade, which in turn drives the valve disk. As the valve disk rotates, the aperture within the valve disk selectively and sequentially communicates the compressed deflecting gas to ports in the valve body. The ports are arranged circumferentially evenly spaced about a central axis of the valve body, which is generally perpendicular to the particle stream of coating material. The deflecting gas radially deflects the particle stream towards the surface to be coated. By sequentially directing the deflecting gas to each port, one insures that the coating material is evenly and completely applied to the surface to be coated.

In a second preferred embodiment of the present invention, each of the deflecting gas ports is associated with its own valve. In one example, an electrically operated pneumatic valve is associated with each port. The valves are selectively opened to provide the sequential flow described above. In a most preferred embodiment of this invention, the valves are capable of being restricted such that one of the valves may begin to be opened and allow some compressed gas flow to its associated port, while a second adjacent valve is fully opened allowing full flow to its associated port. At the same time, a third adjacent valve may be beginning to be closed, thus restricting and reducing the flow to its associated port. In this way, the benefits described above with regard to having a plurality of deflecting gas ports utilized at any one moment are achieved in a reliable, controlled manner.

The method of utilizing this embodiment involves the sequential opening and closing of the electrically operated pneumatic valves to achieve the desired deflecting gas flow. As with the first embodiment, the coating apparatus is moved axially along the surface to be coated, while the deflecting gas flow rotates about the center axis, thus insuring complete and even coating of the surface to be coated. Preferably, air is used as the deflecting gas; however, other gases may be utilized including relatively inert gases, such as nitrogen, or gases adapted for the particular coating system.

It has been determined with the apparatus described above in a two-wire arc system, that the gases are most preferably directed generally perpendicular to the axis of the particle flow, adjacent the "intersection" of the wires, but preferably slightly downstream of the intersection point. Most preferably, the ports direct the gas at an obtuse angle, just downstream of the theoretical wire intersection point.

In a preferred application of the method and apparatus of this invention, the internal surfaces of a plurality of spaced bores may be coated simultaneously. For example, an engine block may include, for example, two, four, six or eight parallel bores. Where the engine block is aluminum, the bores are preferably coated with a hard metal coating, such as steel, to reduce wear. As described, it is not commercially practical to rotate the engine block about each bore. Further, prior rotating head thermal spray devices which spray the coating material radially, may not be suitable for the mass production applications because the spray should be initiated before introduction of the heads in the bores to assure that all of the units are operating correctly. The initial of spray of hot particles, such as atomized molten metal, must therefore be masked to avoid contamination of the parts and coating apparatus.

The thermal spray apparatus of this invention may be initially operated to direct the spray axially and the axial spray pattern confined to be directed through the bores. The nozzle assemblies can then be checked to assure proper operation before introduction of the nozzles in the engine bores. The gang of nozzles are then inserted into the bores and the deflecting gas is generated through the radial ports to deflect particulate coating material radially onto the internal surfaces of the bores. The spray apparatus is then moved axially to coat the entire surface of all of the bores simultaneously.

These and other features of the invention may be best understood from the following specification and drawings, of which the following is a brief description.

BRIEF DESCRIPTION OF THE DRAWINGS

FIG. 1 is a schematic view of the electric-arc coating apparatus incorporating the present invention;

FIG. 2A is a perspective view of a portion of a valving apparatus incorporated into the present invention;

FIG. 2B is a cross-sectional view through a portion of the valving apparatus illustrated in FIG. 2A;

DETAILED DESCRIPTION OF PREFERRED EMBODIMENTS

Figure 3:
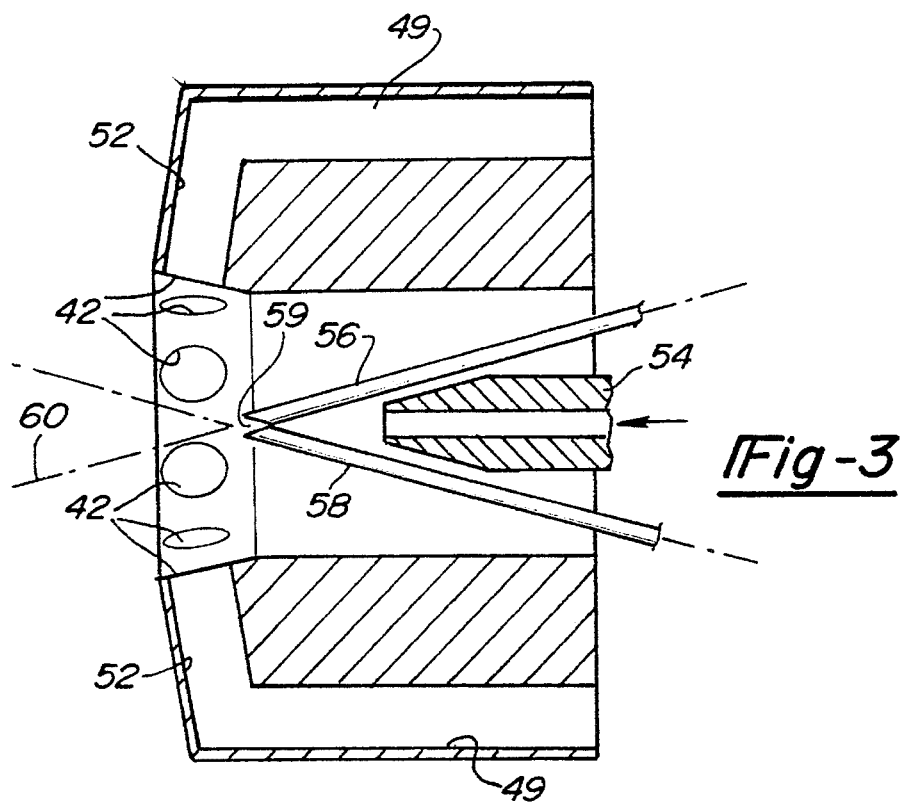
FIG. 3 is a cross-sectional view through a portion of the apparatus shown in FIG. 1.

FIG. 1 shows a partially schematic view of an electric-arc thermal spray apparatus 20 according to the teachings of the present invention. Apparatus 20 is shown coating the interior of a bore 22 in a part 23. Part 23 may be a large metallic member, such as an engine block. The internal surface of bore 22 is desirably coated with a metal coating, as is known in the art. The apparatus 20 provides benefits including an improved coating on the surface of bore 22, as are described above. Although the instant invention is illustrated coating a hollow cylindrical bore, the present invention also provides beneficial results in the coating of other surfaces, such as other concave surfaces.

The coating apparatus has an extending portion 24 extending towards a deflecting nozzle 27. As shown, coating material 26 is directed radially outwardly to coat the interior surface of bore 22. As will be described below, a deflecting gas flow from deflecting nozzle 27 causes this flow. An atomized molten metal particle stream is generated by a thermal spray coating member 28, which in the instant invention may be a two wire electric-arc apparatus, such as are known in the art. The deflecting gas from nozzle 27 deflects the particle stream from the central axis of apparatus 20 towards the interior of the bore 22.

A compressed gas source 30 delivers compressed gas to body 25. This compressed gas is utilized by the deflecting nozzle 27 to cause the deflecting flow of the coating material. As shown, a heater element 31 may be disposed on the compressed gas line to heat the deflecting gas flow. As is known, thermal spray coating techniques heat the coating material and propels the coating material to the surface to be coated. By heating the deflecting gas, which is directed into that coating material flow, one maintains the heat in the coating material when compared to a cooler gas, such as ambient air. Further, the velocity of the deflecting gas may be increased and controlled by heating.

A controller 32 controls the various functions of apparatus 20 including the flow of gas to the various ports in deflecting nozzle 27 as will be described below. The controller also controls the movement of coating member 24, and also all other aspects, of the thermal spray apparatus, including the heat added by heater 31. A power supply 34 provides power to the coating member, to the controller, and to any members necessarily associated with the deflecting nozzle 27, as will be described below. Wire supplies 36 and 38 continuously supplies the consumable wire to the electric-arc coating member 28.

As shown in FIG. 2A, deflecting gas nozzle 27 incorporates an inner end 40 including a plurality of circumferentially spaced generally radially inwardly facing ports 42. Ports 42 are generally evenly spaced and centered about a central axis 44 of nozzle 27. Central axis 44 is coaxial with the particle stream of coating material.

A valve disk 46 is rotatably mounted adjacent to an end 47 of extension 24. An aperture 48 is formed through valve disk 46, which sequentially communicates a portion of the compressed gas from source 30 to ports 42 to deflect the coating material. As shown in FIG. 2A, the aperture 48 extends for such a circumferential extent that it may communicate with as many as three of the ports 42 at any one time. As described above, this provides constant and smooth flow of the coating material to the surface to be coated.

As shown in FIG. 2B, disk 46 has its aperture 48 aligned with a passage 49 in extension 24 which is associated with one of the ports 42. Compressed gas from source 30 communicates with a chamber 50 on an opposed side of valve disk 46 from end 47 of extension 24. The compressed gas passes from chamber 50 through aperture 48 and into passage 49, where it is then directed through port 42 to deflect the flow of coating material. As shown in this embodiment, a turbine blade 51, shown here schematically, rotatably drives the valve disk 46 as the compressed gas is received in the chamber. An enclosure may be designed for the diversion of some flow of the compressed gas to drive the turbine blades. Such a design is within the skill of a worker in this art.

As shown in FIG. 3, passages 49 communicate with passages 52 which extend to ports 42. Ports 42 face generally radially inwardly, preferably at a slight angle about the converging point 59 of the wires 56 and 58. As shown, the particle stream 60 leaves wires 56 and 58 in a generally conical configuration. A flow of compressed atomizing air leaves port 54, to drive the coating material from the arc created at the junction of wires 56 and 58. This creates particle stream 60. By dispensing deflecting gas from ports 42, the particle stream is then directed radially outwardly to the area to be coated.

The preferred embodiment of the invention shown in FIG. 3 is a two-wire arc thermal spray apparatus. As shown, the two wires 56 and 58 are fed from wire feeds 36 and 38 into the bore of the deflecting nozzle 27, preferably at an acute angle of about 30 degrees. As will be understood by those skilled in the art, an electric DC current is impressed across the wires, such that an arc is drawn between the wires, progressively melting the ends of the wires. Gas flow through tube 54 and atomizes the molten metal, which is deflected by the, heated deflecting gas from the deflecting nozzle, as described herein. In the most preferred embodiment of the apparatus of this invention, the ports 52 extend at an angle of slightly greater than 90 degrees and intersects the atomized molted particles just downstream of the theoretical intersection point of the wires 56 and 58 or about 2 to 5 mm downstream of the arc. The most preferred angle defined by the inlet ports 52 is less than 20 degrees relative to perpendicular or an obtuse angle of less than 120 degrees relative to the axis of the passages 49. The angle of deflection may be adjusted by adjusting the relative velocities and flow rates of the gas through ports 52 and line 54. The atomized molten particle stream generated along the longitudinal axis is then directed radially at an angle of about 20 degrees, relative to radial. It will be understood, however, that the method and apparatus of this invention may also be utilized with other thermal spray apparatuses to coat cylindrical or concave surfaces, including, for example, a plasma spray apparatus.

Now, by reviewing FIGS. 2A, 2B and 3 in conjunction, a person skilled in this art will understand the operation of the present invention. Compressed gas is directed to the turbine blade 51 on valve disk 46, causing the valve disk 46 to rotate. At any given time, aperture 48 communicates the compressed gas to as many as three passages 49, which are in turn connected through passages 52 to ports 42. Thus, up to three sequentially spaced ports 42 are directing a deflecting gas towards the atomized molten metal particle stream 60 at any given time. It is preferred that port 48 is sized such that it will typically be starting communication with one passage 49, at the same time being in full communication with a second adjacent passage 49, and terminating communication with a third adjacent passage 49. In this way, two alternately spaced ports will be directing deflecting gas flows at relatively small amounts, while a third central flow is at a relatively great amount. In this way, cyclical low points in the amount of deflecting gas that would occur if only a single port were communicated with compressed air at any time are eliminated. Further, any low spots in the coating which might occur opposed to a space between ports is reduced or eliminated. When the deflecting gas flows from the several ports are combined, the area opposed to the space between those ports should be coated. Thus, by selectively communicating the compressed gas to more than one port, one insures a complete and adequate coating of all areas along the circumference of the area to be coated.

Figure 4:
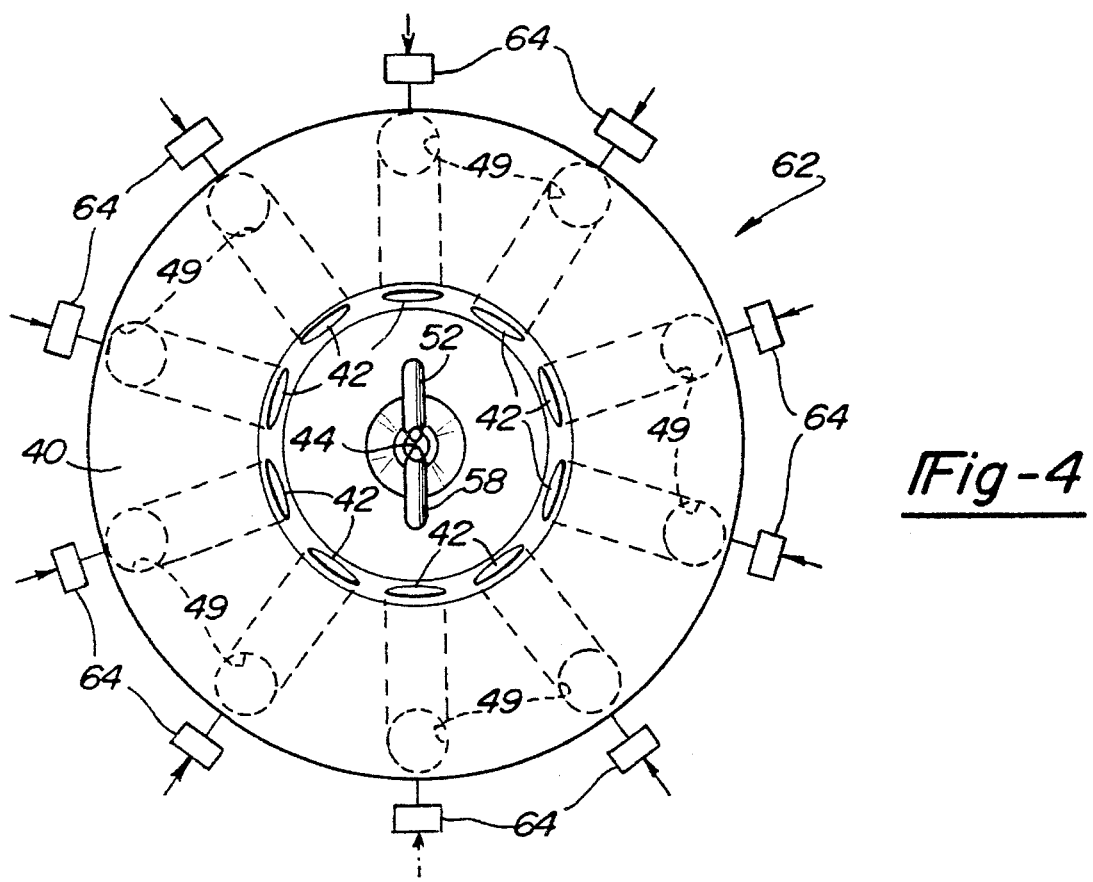
FIG. 4 is an end view of the apparatus of FIG. 1, but incorporating a second embodiment valve system.

FIG. 4 shows an alternative embodiment 62 of this invention, wherein the valve disk 46 is replaced with an individual valve 64 associated with each passage 49. It is preferred that valves 64 be electrically operated valves capable of restricting the flow into the passage 49. Controller 32 controls the operation of the valves 64, such that the sequential flow described above is achieved. Further, as described above, it is beneficial to control the valves such that there are valves opening and closing with fully opened central valves at various times during the operation of system 62. In this way, the benefit of having several deflecting ports operating at any one time is achieved.

Figure 5:
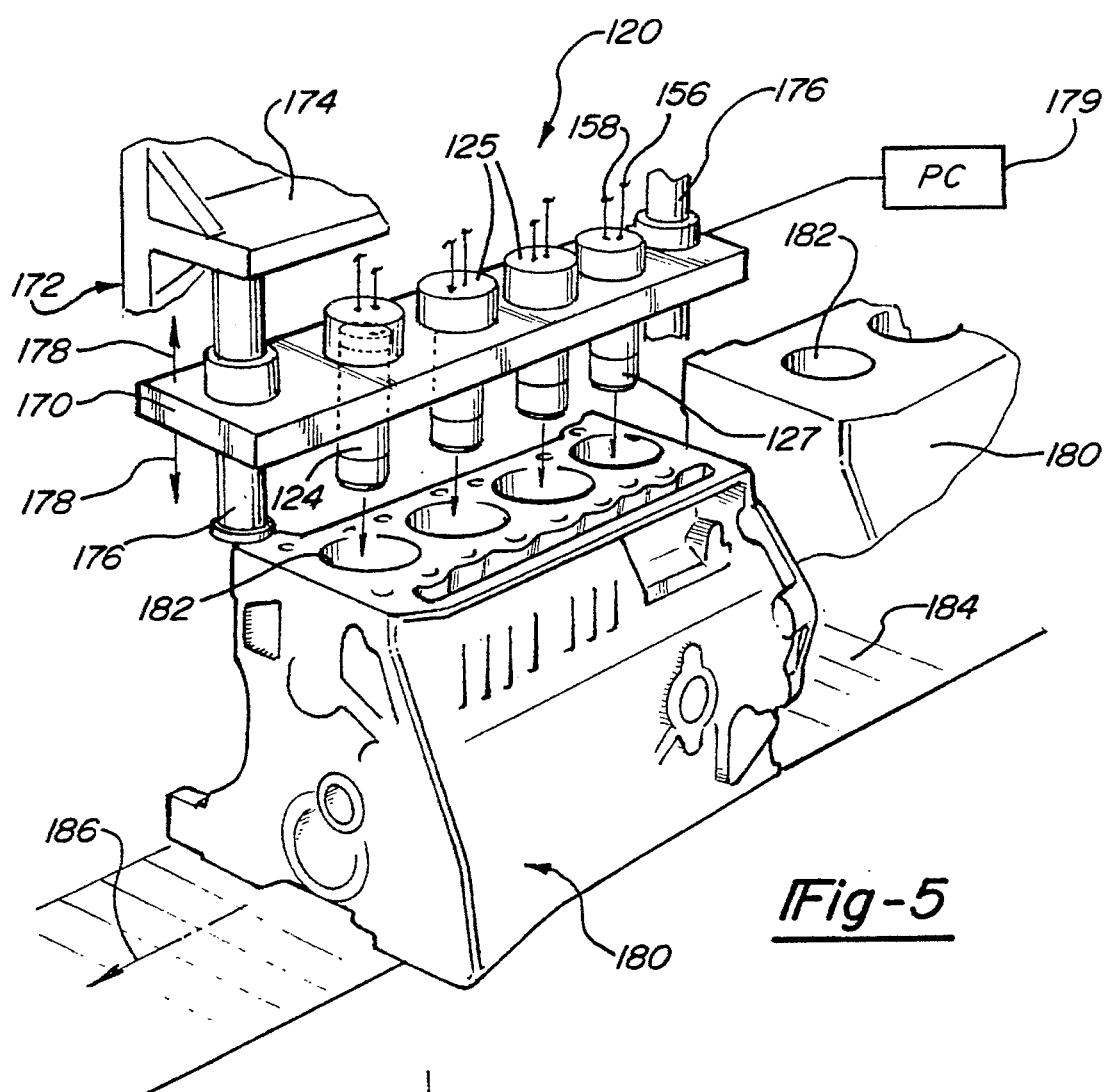
FIG. 5 is a perspective view of the coating apparatus of this invention utilized for coating the cylinder bores of a four cylinder engine block.
Figure 6:
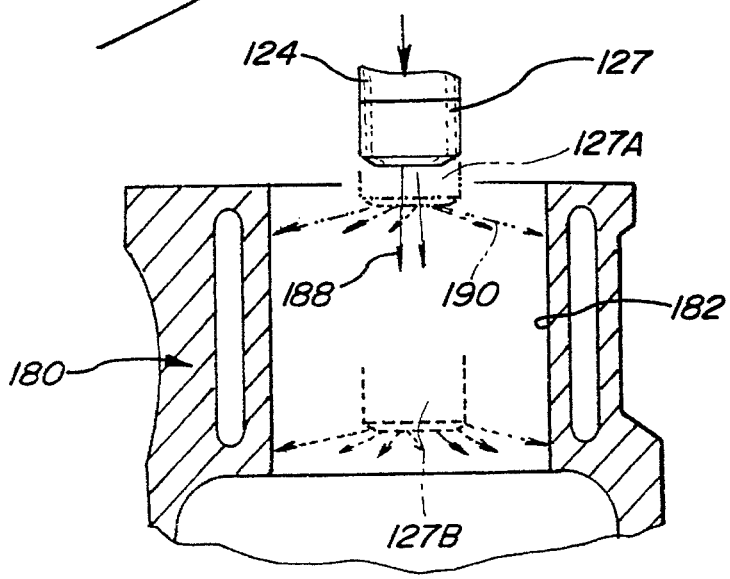
FIG. 6 is a partial side cross-sectional view of an engine block bore, as shown in FIG. 5, receiving the deflecting nozzle of the coating apparatus of this invention and coating the internal surface of the bore.

FIGS. 5 and 6 illustrate the thermal spray coating apparatus of this invention utilized to coat a conventional four cylinder engine. The coating apparatus 120 is mounted on a support plate 170, which is mounted on a hydraulic mechanism 172. The lift mechanism 172 includes a support bracket 174 and a hydraulic piston assembly 176. As will be understood by those skilled in the art, the bracket assembly 174 may be mounted on a stationery support member and the hydraulic piston assembly 176 may be conventional to lift and lower the thermal spray apparatus 120 as shown by arrows 178. As described above, the thermal spray apparatus 120 includes an extension portion 124 extending toward a deflecting nozzle 127 and a body or body portion 125; however, in this embodiment, the apparatus 120 includes four bodies 125, extensions 124, and deflecting nozzles 127 which are supported in parallel spaced relation on the support plate 170. A PC or programmable controller 179, shown schematically, controls the operation of the hydraulic lift assembly 172. The preferred embodiment of the thermal spray coating apparatus 120 is a two-wire, electric-arc spray apparatus, as described above, which includes consumable wires 156 and 158. The wires are fed through the body 125 through the reflecting nozzle, as described above. The common components in FIGS. 5 and 6 are numbered in the same sequence as FIGS. 1 to 4.

The thermal spray coating apparatus 120 show in FIGS. 5 and 6 is being used to coat the cylinder bores 182 of engine block 180. The engine blocks 180 are supported on a conventional conveyor 184 which moves the engine blocks sequentially into alignment with the thermal spray apparatus as shown by arrow 186. The four extensions 124 and deflecting nozzles 127 are then coaxially aligned with the four cylinder bores 172, as shown in FIG. 5. FIG. 6 illustrates the operation of the thermal spray coating apparatus in one of the cylinder bores 182. The deflecting nozzle 127 is initially located above the engine block where it can be tested prior to introduction of the deflecting nozzle 127 in the cylinder bore 182. The thermal spray apparatus is then operated to direct a particle stream axially through the cylinder bores 182, as shown by arrow 188. In the embodiments of the thermal spray apparatus of this invention shown in FIGS. 1 to 4, this is accomplished by impressing a DC electric current through the consumable metallic wires 156 and 158 which draws an arc between the ends of the wires and a gas stream is then directed through tube 54, which atomizes the molten wires and directs the particle stream axially through the bores as shown by arrows 188. The operation of the thermal spray apparatus may then be checked prior to insertion of the deflector nozzles 127 into the engine bores 182, as described above.

The deflector nozzles 127 are then lowered into the cylinder bores 182, as shown in phantom in FIG. 6 at 127A. The operation of the deflecting nozzle assembly 127 is then initiated to deflect the coating particle stream radially outwardly as shown as 190. Either embodiment of the coating apparatus of this invention shown in FIGS. 1 to 4 may be utilized in the thermal spray apparatus 120 shown in FIGS. 5 and 6. The coating apparatus is then lowered into the cylinder bores 182 by hydraulic lift 172 shown in phantom at 127B until the entire internal surface of the cylinder bores 182 are coated. When the coating is complete, the apparatus is turned off and lifted by hydraulic lift 172 for coating the cylinder bores of the next engine block 180. As will be understood, this embodiment of the thermal spray coating apparatus of this invention may be utilized to coat the cylinder bores of any engine block, including, for example, a two, four, six and eight cylinder engine block. Two coating apparatuses each including four angularly oriented supports 170 will be required for V-8 engine.

As will be understood by those skilled in the art, particularly those skilled in the art of electric-arc (two wire) spraying, various materials may be utilized for the consumable wires 56 and 58. As presently understood, the wires must be formed of an electrically conductive material. For example, the wires may be formed of a ferrous material, including, for example, steel and its alloys, titanium and the like. Composite materials may also be utilized, wherein the wire includes a tubular metallic sheath and a powdered core. The core may thus be formed of metallic or a non-metallic material, including for example a powdered ceramic core. In the embodiment disclosed in FIGS. 5 and 6, the internal surfaces of the bores of an engine block are coated with a wear resistant material. Where the engine block is formed of aluminum, for example, the wires may be formed of mild steel which are melted and atomized in the two-wire arc coating apparatus of this invention. Where the gas is air or another oxidizing gas, the atomized molten steel is then oxidized, forming a good, relatively inexpensive wear resistant coating on the aluminum block bores. Because the coating apparatus does not require rotation of the engine block, the deflecting nozzles may then be inserted simultaneously in all of the engine bores, coating all of the bores in one application.

Preferred embodiments of this invention have been disclosed; however, a worker of ordinary skill in the art would recognize that certain modifications would come within the scope of this invention. For that reason the following claims should be studied in order to determine the true scope and content of this invention.

We claim:

1. A thermal spray coating apparatus for thermal spray coating, comprising:

said thermal spray coating apparatus defining a generally central axis for said apparatus;

a deflecting gas valve body surrounding said coating apparatus, and including a plurality of ports circumferentially spaced about said central axis, said ports facing radially inwardly and at an axially forward angle, such that a flow of deflecting gas from said ports may entrain and deflect a coating material from said coating apparatus radially outward;

a supply of compressed gas selectively communicating with each of said ports supplying said deflecting gas to said ports; and a valve assembly operable to selectively communicate said compressed gas to said ports sequentially about the circumference of said deflecting gas valve body.

2. A thermal spray coating apparatus as recited in claim 1, wherein said thermal spray coating apparatus includes two consumable metal wires intersecting at an angle in said deflecting gas valve body, a source of electric current connected to said wires generating an electric-arc between the ends of said wires, thereby forming molten metal from said metal wires, a first source of compressed gas accelerating the molten metal formed in said electric arc in an axial direction forming a particle stream, said ports directing said deflecting gas radially across said particle stream, downstream from said electric arc.

3. A thermal spray coating apparatus as recited in claim 2, wherein said valve assembly includes a valve disk having an aperture which selectively communicates said compressed gas to said ports, said valve disk being rotatable relative to said valve body to sequentially and selectively communicate said compressed gas to each of said ports.

4. A thermal spray coating apparatus as recited in claim 3, wherein said valve disk includes turbine blades, and said compressed gas is communicated to said turbine blades to rotate said vane disk relative to said valve body.

5. A thermal spray coating apparatus as recited in claim 3, wherein said aperture extends for a sufficient circumferential extent such that it can communicate compressed gas to more than one of said ports at any given time.

6. A thermal spray coating apparatus as recited in claim 2, wherein said valve assembly includes an individually controllable valve associated with a passage leading to each of said ports.

7. A thermal spray coating apparatus as recited in claim 6, wherein a control for said valve allows more than one of said valves to be open at any given time.

8. A thermal spray coating apparatus as recited in claim 2, wherein a heater is placed on a line for said compressed gas such that said compressed gas may be heated before being directed to said ports.

9. A thermal spray coating apparatus as recited in claim 1, wherein said valve assembly includes a valve disk having an aperture which selectively communicates said compressed gas to said ports, said valve disk being rotatable relative to said valve body to sequentially and selectively communicate said compressed gas to each of said ports.

10. A thermal spray coating apparatus as recited in claim 9, wherein said valve disk includes turbine blades, and said compressed gas is communicated to said turbine blades to rotate said valve disk relative to said valve body.

11. A thermal spray coating apparatus as recited in claim 9, wherein said aperture extends for a sufficient circumferential extent such that it can communicate compressed gas to more than one of said ports at any given time.

12. A thermal spray coating apparatus as recited in claim 1, wherein said valve assembly includes an individually controllable valve associated with a passage leading to each of said ports.

13. A thermal spray coating apparatus as recited in claim 1, wherein a heater is dispensed on a line for said compressed gas such that said compressed gas may be heated before being directed to said ports.

14. An apparatus for coating a part with a metallic coating comprising:
   two consumable electrically conductive metallic wires converging to a converging point at their ends;
   an electric current impressed on said wires creating an arc and melting said wire ends forming a particle stream;
   an atomizing gas supply supplying a gas to said converging point of said wires to carry said particle stream axially forward;
   a deflecting gas valve assembly being disposed radially outward of said consumable wires, said deflecting gas valve assembly deflecting gas from a direction which is rotatable relative to said two wires deflecting a molten metal particle stream radially outward towards a surface to be coated.

15. An apparatus as recited in claim 14, wherein said deflecting gas valve assembly includes a nozzle with a plurality of ports circumferentially spaced about said converging point and said ports being selectively communicated with a supply of compressed gas such that said compressed gas sequentially deflects said particle stream radially outward towards the surface to be coated.

16. An apparatus as recited in claim 15, wherein said deflecting gas valve assembly includes a valve disk having an aperture which selectively communicates said compressed gas to said ports.

17. An apparatus as recited in claim 16, wherein said valve disk includes turbine blades, and said compressed gas is selectively driven against said turbine blades to rotate said valve disk to selectively communicate said compressed gas to said ports.

18. An apparatus as recited in claim 15, wherein individual valves are associated with each of said ports, said individual valves being selectively open to selectively and sequentially communicate compressed gas to said circumferentially spaced ports.

19. A thermal spray coating apparatus for simultaneously thermal spray coating the internal surfaces of a plurality of bores having generally parallel longitudinal axis, comprising:
   said thermal spray apparatus having a plurality of deflecting nozzles spaced in parallel relation to be received in said bores, said deflecting nozzles each having an axial bore, said thermal spray apparatus directing a stream of coating particles entrained in a first gas stream axially through each of said axial bores, said deflecting nozzles each having a plurality of spaced radially extending ports surrounding said axial bores;
   a supply of compressed gas selectively communicating with each of said radially extending ports; and
   a valve assembly operable to selectively communicate said compressed gas to said ports sequentially about the circumference of said deflecting nozzles, said radially extending ports directing a second stream of gas radially across said stream of coating particles, deflecting said stream of coating particles radially, coating said internal surfaces of said bores.

20. A thermal spray coating apparatus as recited in claim 19, wherein said apparatus includes a transfer mechanism simultaneously moving said deflecting nozzles axially through said bores, simultaneously coating said internal surfaces of said bores.

21. A thermal spray coating apparatus as recited in claim 20, wherein said thermal spray apparatus includes a wire feed feeding a pair of consumable metallic wires intersecting at an angle in each of said deflecting nozzles, a source of electric current connected to each of said pair of wires generating an arc between ends of each of said pair of wires, a first source of compressed gas accelerating the molten metal formed in said electric arc in an axial direction forming a particle stream, said ports directing said compressed gas radially across said particle stream, downstream from said electric arc.

22. A thermal spray coating apparatus for simultaneously thermal spray coating a plurality of bores having generally parallel longitudinally axis:
   said thermal spray apparatus having a plurality of deflecting nozzles spaced in parallel relation to be received in each of said bores, said deflecting nozzles each having an axial bore, said thermal spray apparatus directing a stream of coating particles entrained in a first gas stream axially through each of said axial bores of said deflecting nozzles, said deflecting nozzles each having a plurality of spaced radially extending ports surrounding each of said axial bores;
   a supply of compressed gas selectively communicating with each of said ports supplying deflecting gas to said ports;
   a valve assembly operable to selectively communicate said supply of compressed gas to said radially extending ports sequentially about the circumference of said deflecting gas nozzles; and
   a transfer mechanism simultaneously moving said deflecting nozzles axially through said bores, said compressed gas deflecting said stream of coating particles radially outward onto said internal surfaces of said bores as said deflecting nozzles are moved axially through said bores, simultaneously coating said internal surfaces of said bores.

23. A thermal spray coating apparatus as defined in claim 22, wherein said thermal spray apparatus includes a wire feed feeding a pair of consumable metallic wires intersecting at an angle in each of said deflecting nozzles, a source of electric current connected to each of said pairs of wire generating an electric arc between the ends of said pairs of wires.

* * * * *